Jan. 15, 1957 J. W. RUNDT 2,777,261
ORIENTATION TESTING DEVICE FOR WORK FEEDERS
Filed June 19, 1952 2 Sheets-Sheet 1
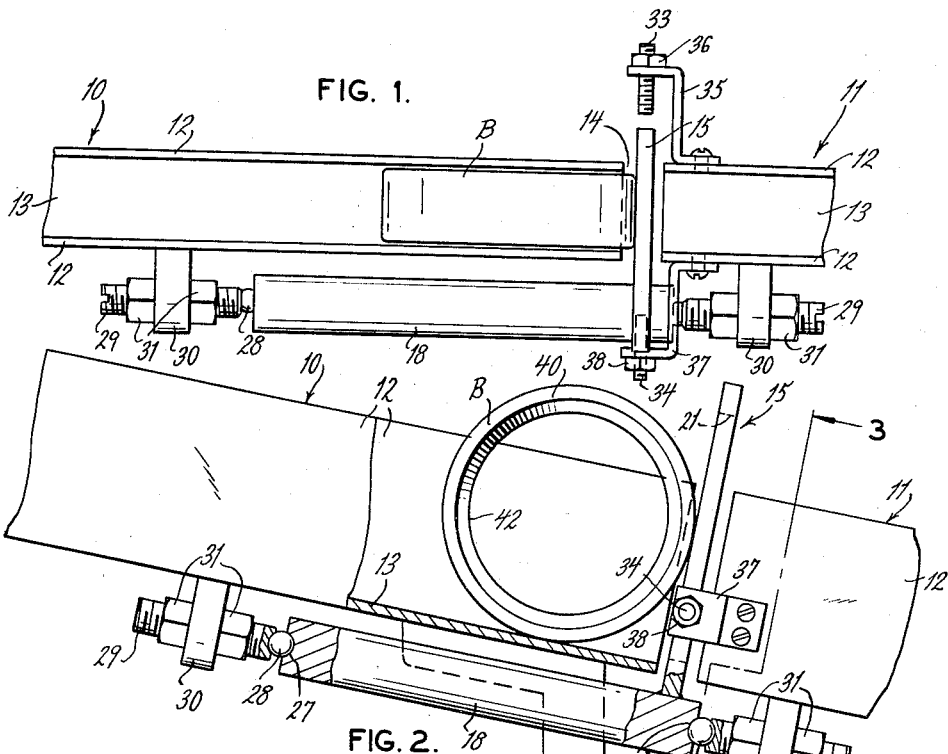
INVENTOR.
JOHN W. RUNDT
BY
Gravely, Lieder, Woodruff & Dees
ATTORNEYS Jan. 15, 1957 J. W. RUNDT 2,777,261
ORIENTATION TESTING DEVICE FOR WORK FEEDERS
Filed June 19, 1952 2 Sheets-Sheet 2

INVENTOR.
JOHN W. RUNDT
BY
ATTORNEYS

United States Patent Office 2,777,261
Patented Jan. 15, 1957

2,777,261

ORIENTATION TESTING DEVICE FOR WORK FEEDERS

John W. Rundt, Canton, Ohio, assignor to The Timken Roller Bearing Company, Canton, Ohio, a corporation of Ohio Application June 19, 1952, Serial No. 294,438

7 Claims. (Cl. 51—215)

This invention relates to orientation testing devices for work feeders to determine the correct from the incorrect position of a series of articles or bodies which are to be conducted into a work station for further processing.

An important object of this invention is to provide an orientation testing device for interrupting the movements of articles into a work station when incorrectly oriented with respect to the position the articles should assume at the work station.

Another object of this invention is to provide a simple mechanical device for testing the orientation of articles passing into a work station, in which the testing operation is done in response to the movement of the articles.

It is also an object hereof to provide a device which may be disposed in an article conveying system as a safety expedient to test for orientation errors and guard against malfunctioning of article orienting means of known types.

It is another important object to provide a device for testing the orientation of rolling bodies, in which the device is provided with a test aperture having margins of different curvature, sized to receive and pass the oriented rolling bodies and to arrest those bodies which are improperly oriented.

The present invention will be described in connection with its relation to the process of honing cup races. The cup bodies may be fed to the honing machine by rolling under the influence of gravity through suitable chutes. This honing process requires that all of the cup races be positioned, when entering the honing machine with the front faces in the direction of the honing stone. This body position brings the thin front face of the cup with the larger internal diameter of the tapered bore to the honing stone. If the cup races are placed in reverse orientation with the back face placed to the honing stone, the honing stone would be incapable of passing over the small internal diameter and breakage would occur. The present testing device eliminates the improper orientation of the front and back faces of cup races so that damage to the cup races and to the honing machine will be prevented.

One form of the testing device, which is herein preferred, is capable of installation in a feed chute for stopping the mis-positioned cup races before they can enter the honing machine. The operation of the device is completely automatic, simple in construction and relatively free of wear and tear. The service of one operator is all that is necessary to remove the mis-positioned cup races when stopped by the testing device. It is also contemplated that this device may be used as a safety device by locating it between an orienting mechanism of which there are several kinds available, and the honing machine to protect the cups and machine against damage which might result if the orienting mechanism fails to operate correctly.

A preferred form of the invention consists in the provision of a rocking member formed with a curved or semi-circular slot which is sized to receive and pass properly oriented cup races and to block passage of improperly oriented cup races. The testing device employs curved surfaces in the slot and curved surfaces on the cup races to create a wedge-like action therebetween, whereby the rocking member will be caused to move in a direction allowing the oncoming annular cup race to pass into and through the curved slot if properly oriented. The testing device also makes use of two surfaces having matching or mismatching curvatures for determining respectively the correct from the incorrect position of orientation.

The present invention also includes the novel parts and elements, and combinations of parts and elements which will be hereinafter described in connection with the accompanying drawings, wherein:

Fig. 1 is a fragmentary top plan view of one preferred form of testing device, hereinafter to be more particularly described;

Fig. 2 is a fragmentary elevational view of the testing device shown in Fig. 1, portions of the device being broken away to illustrate details;

Fig. 3 is a transverse elevational view taken at line 3—3 in Fig. 2;

Fig. 4 is a fragmentary plan view in section at line 4—4 of Fig. 3, corresponding to an initial stage in the operation of the testing device;

Figure 5:
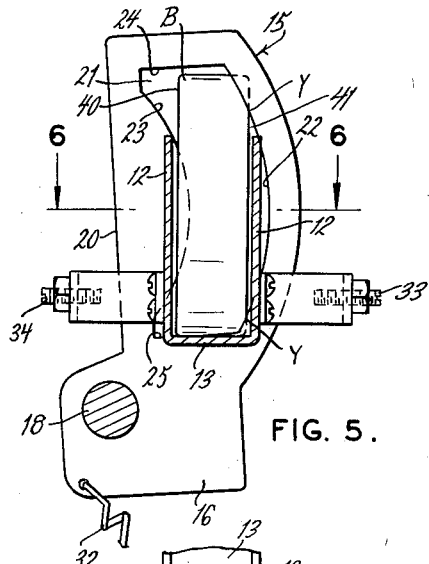
Fig. 5 is a transverse elevational view of the rocking test member at a different stage in its operation.
Figure 7:
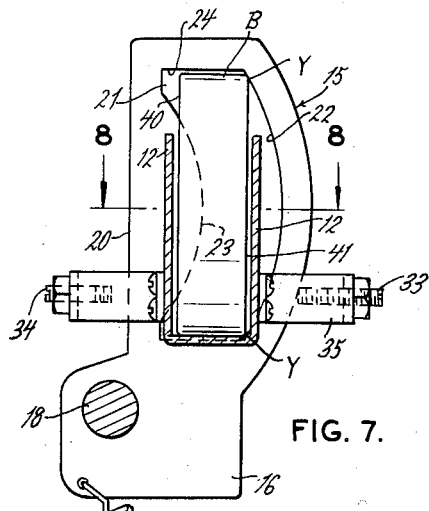
Fig. 7 is a view similar to Fig. 5, but showing the operation at a later stage thereof.
Figure 6:
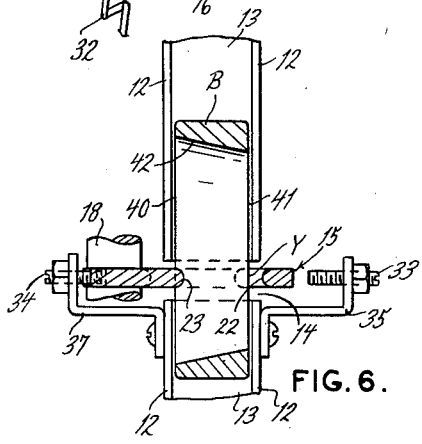
Fig. 6 is a detailed sectional view taken at line 6—6 in Fig. 5.
Figure 8:
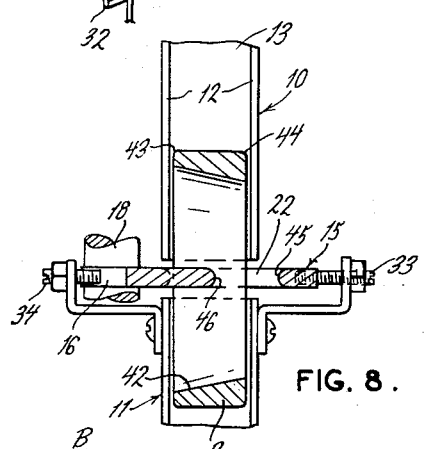
Fig. 8 is a detailed sectional view as seen at line 8—8 in Fig. 7.

Referring now to Figs. 1, 2 and 3 in particular, the present testing device includes an inclined feed chute having a receiving section 10 and a discharge section 11. Each of these chute sections includes vertical parallel side walls 12 and a bottom side wall 13. The receiving and discharge chute sections are separated by a gap 14 in which there is operatively disposed a rocking test member 15, normally disposed in the path of movement of the bodies or cup races, one of which is shown at B.

The rocking test member 15 consists in a flat plate having a base portion 16 provided with an aperture 17 to receive a pivot element 18. The base 16 is provided with an upstanding test section 20 formed with a curved slot 21. The slot is provided with opposite curved margins 22 and 23 and opposite straight margins 24 and 25. The curvature of the margins 22 and 23 is different, the radius for the margin 23 being less than that for margin 22. The function of this member will be described presently.

The pivot element 18 for the test member 15 has a suitable socket or depression 27 formed in each end thereof to receive a supporting ball element 28. Each of the balls 28 is held in the socket 27 by means of an adjustably element 29 disposed in a fixed bracket 30 carried at the underside of the chute walls 13. Each of the elements 29 is provided with a pair of lock nuts 31 at each side of the bracket 30 for the purpose of holding the position of the elements 29 to the adjustment which gives the desired freedom of pivoting movement of the element 18 and the test member 15.

The test member 15 is normally located against a stop with the slot 21 aligned with the chute by means of a resilient element or spring 32 anchored at one end in a bracket 32' carried by the chute walls 13 and having its opposite end connected to the base 16 at a position below the pivot axis of the element 18. Close adjustment of the said initial position desired for the test member 15 is obtained by means of one of a pair of oppositely located and adjustable stop screws 33 and 34. The stop screw 33 is carried in a bracket 35 and is held in adjusted position by the nut 36. Stop screw 34 is carried in a bracket 37 and is held in adjusted position by a nut 38. The normal at rest position of the testing member 15 is determined by adjusting the stop 34, whereas the stop 33 is effective to change the stroke or outer limit of rocking movement allowed for the testing member 15. It is observed that the testing member is free to rock or oscillate in the gap 14 across the two sections 10 and 11 of the chute to test the orientation of each of the bodies, one typical cup body being shown at B.

The operation will now be described in connection with a properly oriented body B. Attention is directed to Figs. 4 to 8 inclusive, wherein the body B is shown rolling down the inclined chute. The body is formed with an annular front face 40, an annular back face 41, and a tapered bore 42 with its largest internal diameter at the front face and its smallest internal diameter at the back face. A body of this shape, when viewed in section, is seen to have a thin annular margin constituting the front face 40. The back face 41 of the body is constituted by a relatively thick annular portion. The two faces are also distinguishable as to relative areas of the thin and thick margins. The front face of the body is provided with a curved edge 43 and the back face has a similar outer curved edge 44. The test member 15 is provided with the cooperating rounded face 45 on the curved margin 22, and a similar rounded face 46 on the curved margin 23.

In the following description the testing member 15 will be assumed in its initial position against stop element 34 and adjusted so that the curved margins 22 and 23 are aligned with the side walls 12 of the chute action 10. In properly oriented position, in Fig. 4, the annular curved edge 44 on the body will strike at a single place denoted at point X on the curved face 45 of the curved margin 22 of the slot 21. It must be understood that the rolling body B has a certain amount of gravitational momentum due to the inclined position of the chute section 10, so that the body B penetrates the curved slot 21 and the point of contact X just previously mentioned expands and becomes two points of contact Y—Y. These two points tend to separate and move equal distances on each side of the original point of contact X. Simultaneously with the point of contact established and the progressive expansion of the two points of contact along the curved margin 22 of slot 21, it will be appreciated that the opposed curved margin 23 will be caused to enter and fit into the bore 42 of the body. This occurs by reason of the wedge-like action of edge 44 on the face 45, the pivoted mounting of the test member 15 and the location of the body B at one side of the pivot axis of the element 18 which supports the test element 15. In other words, the test member 15 is caused to rock or pivot in a clockwise direction, as viewed in Fig. 3, in opposition to the spring 32 which always acts to restore the test member to its initial position. If the test margin 23 fits the bore, the body is free to move through the slot 21.

The action occurring between the outer curved edge 44 and face 45 is very smooth and wedge-like. This action may be described as one in which the edge 44 tends to crawl along the face 45 of the curved margin 22. The first point of contact X, Fig. 4, becomes two points of contact Y—Y, Figs. 3 and 5, as this crawling contact continues, until finally the body B has passed halfway through the test member 15. This is the position illustrated in Fig. 7. At this time the curved surface 23 having the smaller radius of curvature is freely located within the tapered bore 42 of the body B and does not interfere with the passage of the body through the slot. In other words, the curved slot margin 23 is sized to penetrate the bore 42 of the body and permit the latter to pass without obstruction. Once the body has reached the halfway position in slot 21, spring 32 reverses the member 15 and urges the body into the discharge section 11 of the chute.

Figure 9:
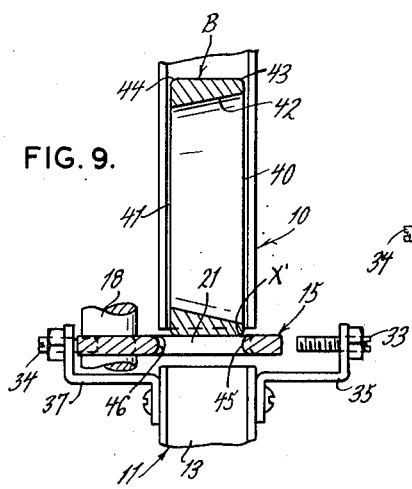
Figs. 9 and 10 are sectional plan views like that of Fig. 4, but illustrating the action of the testing device when a cup race is mispositioned, Fig. 9 illustrating the initial position and Fig. 10 illustrating the final position in which the testing member blocks passage of the cup race.
Figure 10:
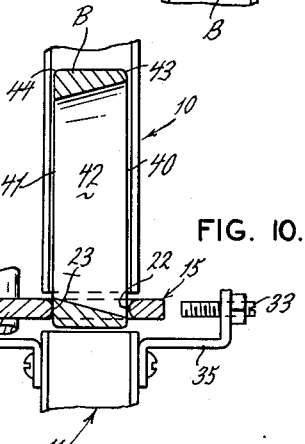

The operation of the present device will be now described in connection with an improperly oriented body. Reference will be directed to Figs. 9 and 10, wherein the rolling body B is shown with its thick annular back face 41 and its thin annular front face 40 reversed to the position first shown in Fig. 4. In this relation, the body initiates a point of contact X' between its curved edge 43 and the rounded face 45 of the test member 15. This point of contact splits and becomes two points of contact which rapidly separate or move away from each other at opposite sides of the diameter of the body B, so that the body B tends to crawl into the curved slot 21 in the test member 15. Now however, with the back face 41 located adjacent the curved margin 23 an obstruction occurs, as shown in Fig. 10. The obstruction or binding is due to the larger area of the face 41 and the smaller internal diameter of the bore 42 being placed toward the curved margin 23 which has a greater radius of curvature. The advancing rounded face 46 of the member 15 moves against the back face 41 before the leading portion of the body B has had time to clear the path of the test member 15. In this incorrectly oriented position of the body B, the curved margin 23 of the slot 21 is oversized relative to the diameter of the bore 42 at the small end. The test member 15 is positively prevented from rocking or pivoting across the path of movement of the body B, and becomes a barrier in the chute. The incorrectly oriented body may then be removed and the member 15 restored to its initial position.

The foregoing description has dealt with a cup body in which the area of the annular back face is greater than the area of the annular front face. The principle involved in the present testing device, that of passing a correctly oriented body through a curved opening by matching curved surfaces or margins having a "sized" relation, may be employed with other bodies in which one end has a greater area than the other and an internal curved surface is matched with a curved test surface of the proper size. It may also be used in connection with bodies having a closed end.

The manufacture of anti-friction bearings of the tapered roller types requires accuracy in forming the tapered races. The use of honing machines of automatic type requires accuracy in all movements, and the testing device hereof will assure the accuracy as to orientation of the bodies.

What I claim is:

1. In a device for testing the orientation or articles that have an opening in at least one surface thereof so that improperly oriented articles may be arrested and properly oriented articles passed automatically, articles each having an opening in at least one surface, an inclined article guide chute of channel section, the articles passing along said chute impelled by gravity with the opening therein movable adjacent one side wall of said chute, and an article orientation testing member movably mounted adjacent to said chute in position to traverse the path of the articles moving in said chute, said testing member having an opening therethrough adapted to register with said chute whereby to receive and pass properly oriented articles and stop improperly oriented articles, the opening in said testing member having spaced article testing margins adapted to be contacted by the articles impelled by gravity, one of said margins being adapted upon article contact to cause movement of said testing member transversely of the path of articles in said chute and another of said margins adapted to simultaneously move into the opening in properly oriented articles only to permit passage of said articles through the opening in said testing member.

2. In a device for testing the orientation of articles that have an opening in at least one surface thereof so that improperly oriented articles are detected and can be reversed to proper orientation, articles having an opening in at least one surface thereof, an open inclined article impelling chute having spaced side walls and inlet and outlet ends, the articles passing along said chute impelled by gravity with the opening therein adjacent to one side wall of said chute, an article orientation testing member located between the ends of said chute adapted to be engaged by each article passing along said chute, said testing member having an opening defined by spaced article testing margins which are adapted to receive and pass properly oriented articles, one of said testing margins being adapted to move into the opening in properly oriented articles to permit passage of said articles through the opening in the testing member and being adapted to bind upon an improperly oriented article and prevent passage through said testing member, and means for mounting said testing member for movement transversely of said chute in response to engagement thereof by said impelled articles.

3. The device set forth in claim 2, wherein said opening in said testing member is a slot and said testing margins are oppositely spaced and shaped to test for the location of the opening in the surface of each of the articles.

4. The device set forth in claim 2, wherein said opening in said testing member is a curved slot and said article testing margins are curved and adapted to cooperate with the articles being tested, both of said testing margins cooperating with properly oriented articles to pass said articles through the curved slot in the testing member and to bind upon improperly oriented articles to prevent passage thereof.

5. In a device for testing the orientation of annular bodies, annular bodies having a tapered opening therethrough, an inclined chute having spaced sides to guide the annular bodies while moving along the incline, said annular bodies being positioned in said chute and having the tapered opening therein extending between said spaced chute sides, an orientation testing member extending across said chute between said sides to intercept the bodies, said testing member having an opening defined in part by opposed margins spaced substantially the width of the annular bodies and registering with the chute sides to admit the properly oriented bodies therethrough, and means mounting said testing member for movement across said chute in response to the bodies admitted to said opening, one of said opposed margins cooperating with the bodies adjacent to the opening therethrough for testing the bodies for orientation and another of the opposed margins simultaneously acting, upon engagement by the bodies, to cause movement of said testing member across said chute.

6. The testing device as set forth in claim 5, wherein said opposed margins of the opening in said testing member are concave and convex relative to the body being tested, said concave margin upon engagement by the body being tested effecting movement of said testing member across said chute.

7. In a device for testing the orientation of articles having an orientation determining opening in one surface thereof, a chute having spaced side walls for guiding the articles along a predetermined path, said orientation determining opening in the articles being positioned adjacent to one of said chute side walls, and testing means in said path adapted to test for the location of the orientation determining opening on each of said articles, said testing means being movable transversely relative to the chute and having spaced margins for cooperating with different surfaces on the articles whose orientation is being tested, a first of said spaced margins cooperating with each of said articles to produce said transverse relative movement and a second of said spaced margins simultaneously cooperating with the orientation determining opening to permit passage between said spaced margins of properly oriented articles and said second of said spaced margins engaging improperly oriented articles and in cooperation with said first spaced margin preventing passage therebetween of improperly oriented articles.

References Cited in the file of this patent

UNITED STATES PATENTS

| | | |
|---|---|---|
| 567,200 | Senna | Sept. 8, 1896 |
| 602,804 | Hardenbrook | Apr. 19, 1898 |
| 1,097,977 | James | May 26, 1910 |
| 1,221,702 | Douglas | Apr. 3, 1917 |
| 1,707,708 | Caster | Apr. 2, 1929 |
| 2,402,097 | Spraker | June 11, 1946 |
| 2,570,903 | Yost | Oct. 9, 1951 |